US006383405B1

(12) United States Patent
Blanton et al.

(10) Patent No.: US 6,383,405 B1
(45) Date of Patent: May 7, 2002

(54) SOLID ELECTROLYTE PARTICLES COMPRISING $MAG_4I_5$

(75) Inventors: Thomas N. Blanton; Seshadri Jagannathan; Mark E. Irving, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/576,726

(22) Filed: May 23, 2000

Related U.S. Application Data

(62) Division of application No. 09/098,968, filed on Jun. 17, 1998, now Pat. No. 6,120,984.

(51) Int. Cl.[7] .......................... H01G 9/032; C01B 9/06

(52) U.S. Cl. ..................... 252/62.2; 423/463; 424/401; 429/318; 430/567

(58) Field of Search .......................... 423/463; 428/398, 428/401; 430/567; 429/318; 252/62.2

(56) References Cited

U.S. PATENT DOCUMENTS

| | | | | | |
|---|---|---|---|---|---|
| 3,519,404 | A | * | 7/1970 | Argue et al. | 423/463 |
| 3,708,729 | A | * | 1/1973 | Berger | 252/62.2 X |
| 3,719,612 | A | * | 3/1973 | Johnston | 423/463 X |
| 3,719,746 | A | * | 3/1973 | Johnston | 423/463 |
| 3,870,522 | A | * | 3/1975 | Moisar et al. | 430/567 |
| 4,002,479 | A | | 1/1977 | Susuki et al. | |
| 4,094,684 | A | * | 6/1978 | Maskasky | 430/567 X |
| 4,147,551 | A | * | 4/1979 | Finnicum et al. | 430/567 |
| 4,180,402 | A | * | 12/1979 | Andreev et al. | 430/567 X |
| 4,636,461 | A | * | 1/1987 | Becker et al. | 430/567 X |
| 4,692,400 | A | * | 9/1987 | Kumashiro et al. | 430/567 X |
| 4,879,904 | A | | 11/1989 | Shaw et al. | |
| 5,244,783 | A | * | 9/1993 | Chang | 430/567 |
| 6,120,984 | A | * | 9/2000 | Blanton et al. | 430/619 |

OTHER PUBLICATIONS

Co–pending application Ser. No. 08/939,465 (our Docket No. 72286) filed Sep. 29, 1997, entitled Photothermographic Elements, Inventors Dankosh et al.

* cited by examiner

*Primary Examiner*—Richard D. Lovering
(74) *Attorney, Agent, or Firm*—Chris P. Konkol

(57) ABSTRACT

This invention comprises a process for generating particles of $MAg_4I_5$, wherein M is a monovalent cation, which comprises dissolving AgI and MI in a polar solvent followed by precipitating particles of $MAg_4I_5$ by adding the solution to a nonpolar solvent. The resulting $MAg_4I_5$ is in the form of anisotropic crystalline particles. The $MAg_4I_5$ particles can be used in the preparation of a photothermographic element. The invention also comprises method of preparing a stable aqueous emulsion of $MAg_4I_5$ particles.

2 Claims, 5 Drawing Sheets

SOLID ELECTROLYTE PARTICLES COMPRISING $MAG_4I_5$

This is a Divisional of application Ser. No. 09/098,968, filed Jun. 17, 1998, now U.S. Pat. No. 6,120,984.

FIELD OF THE INVENTION

This invention relates to a composition comprising $MAg_4I_5$, wherein M is a monovalent cation, in the form of anisotropic crystalline particles; a process for preparing $MAg_4I_5$; an emulsion comprising $MAg_4I_5$ in an organic solvent, a photothermographic element comprising an emulsion layer comprising $MAg_4I_5$ in the form of anisotropic particles; and a method of forming a stable aqueous dispersion of $MAg_4I_5$.

BACKGROUND OF THE INVENTION $MAg_4I_5$ (wherein M is a monovalent cation) is a high ionic conductivity solid electrolyte. Conventional $MAg_4I_5$ preparation methodology involves the dissolution of MI in molten AgI. Stoichiometric amounts of MI and AgI are ground then melted in an alumina crucible above 560° C., in flowing argon, then cooled to room temperature. The resulting ingot is then ground by ball milling for several hours to produce $MAg_4I_5$ in powder form.

Commonly assigned, copending application Ser. No. 08/939,465, filed Sep. 29, 1997, now abandoned, discloses an AgI based photothermographic imaging system that utilizes the controlled decomposition of $MAg_4I_5$ in acetone as the process to generate an imaging material. The $MAg_4I_5$ reagent disclosed in the '465 application is generated by the above described conventional preparation methodology. This process requires high temperatures and numerous process steps. It would be desirable to produce the $MAg_4I_5$ by a simpler method.

As discussed in the '465 application, $MAg_4I_5$ can be used to generate light sensitive AgI for use in a photothermographic element. In preparing photothernographic elements as described in the '465 application, an organic solvent is used for forming the light sensitive imaging layer. It would be desirable to be able to use water as the solvent in preparing a photothermographic element. However, $MAg_4I_5$ is unstable in water. It would be desirable to provide a stable aqueous composition containing $MAg_4I_5$.

PROBLEM TO BE SOLVED BY THE INVENTION

It is desirable to provide a simpler method of preparing $MAg_4I_5$ without high-temperature processing or ball milling. It would also be desirable to prepare $MAg_4I_5$ dispersed in an organic solvent medium, which may contain a binder, for use in preparing an imaging layer of a photothermographic element. It is also desirable to prepare $MAg_4I_5$ in powder form which can be directly dispersed in an organic solvent. Further, it would be desirable to provide a stable aqueous composition comprising $MAg_4I_5$ for a variety of uses including use in a photographic or photothermographic element.

SUMMARY OF THE INVENTION

One aspect of this invention comprises a composition comprising $MAg_4I_5$, wherein M is a monovalent cation, in the form of anisotropic crystalline particles.

Another aspect of this invention comprises a process for generating particles of $MAg_4I_5$, wherein M is a monovalent cation, which comprises dissolving AgI and MI in a polar solvent followed by precipitating particles of $MAg_4I_5$ by adding the solution to a nonpolar solvent.

Yet another aspect of this invention comprises an emulsion comprising $MAg_4I_5$, wherein M is a monovalent cation, in an organic solvent.

Still another aspect of this invention comprises a photothermographic element containing at least one emulsion layer comprising $MAg_4I_5$, wherein M is a monovalent cation, in the form of anisotropic crystalline particles.

A further aspect of this invention comprises a method for preparing a stable aqueous emulsion of $MAg_4I_5$, wherein M is a monovalent cation, which method comprises forming a saturated solution of water and a solute and then adding $MAg_4I_5$ to the saturated solution.

ADVANTAGEOUS EFFECT OF THE INVENTION

This invention provides:

(1) anisotropic crystalline particles of $MAg_4I_5$, where M is a monovalent cation;

(2) an alternative to high temperature processing to make $MAg_4I_5$, where is a monovalent cation;

(3) a method of precipitating $MAg_4I_5$, where M is a monovalent cation, articles in organic solvent;

(4) a method of forming fine particles of $MAg_4I_5$, where M is a monovalent cation, without ball milling;

(5) a procedure for stabilizing fine particles of $MAg_4I_5$, where M is a monovalent cation, in aqueous environments; and (6) a photothermographic element containing anisotropic crystalline particles of $MAg_4I_5$.

BRIEF DESCRIPTION OF THE DRAWINGS

FIG. 1 shows a characteristic X-ray diffraction pattern for a material prepared in Example 3 in which the major phase was found to be $RbAg_4I_5$ and the minor phase was found to be $Rb_2AgI_3$.

FIG. 2 shows a characteristic X-ray diffraction pattern for a material prepared in Example 4 in which the major phase was found to be $KAg_4I_5$, the moderate phase was found to be KI, and a trace amount was found to be $K_2AgI_3$.

FIG. 3 shows a characteristic X-ray diffraction pattern for a material prepared in Example 5 in which the major phase was found to be $RbAg_4I_5$ and the minor phase was found to be $RbAgI_3$.

FIG. 4 shows a characteristic X-ray diffraction pattern for a material prepared in Example 6 in which the major phase was found to be $RbAg_4I_5$ and the minor phase was found to be $Rb_2AgI_3$.

FIG. 5 shows a characteristic X-ray diffraction pattern for a material prepared in Example 6 in which the major phases was found to be $RbAg_4I_5$ and AgI, and the minor phase was found to be $Rb_2AgI_3$.

DETAILED DESCRIPTION OF THE INVENTION

Figure 1:
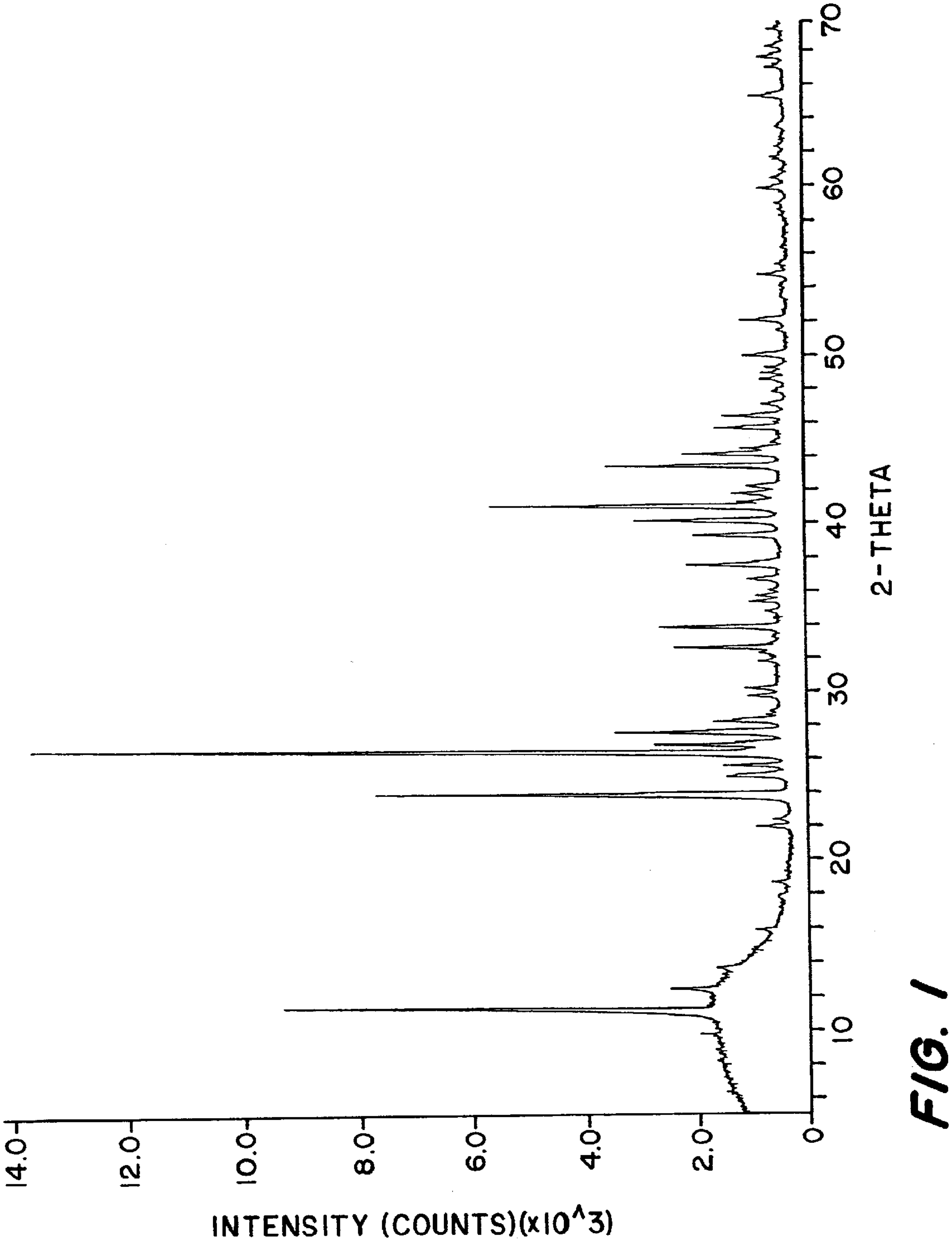
FIGS. 1–5 represent X-ray diffraction (XRD) patterns of $MAg_4I_5$ particles prepared as set forth in the examples set forth below.

The $MAg_4I_5$ of this invention is in powder form in which substantially all $MAg_4I_5$ particles are anisotropic. The fine particles are substantially monomorphic, with substantially all of the particles being rod like in shape having an equivalent circular diameter of about 0.4 to about 2 microns (μm), with a median of about 1 μm and a length of about 4 to about 20 μm with a median of 10 μm. Preferably at least 90% of the $MAg_4I_5$ particles are anisotropic, more preferably 95% and most preferably 98%.

In accordance with this invention $MAg_4I_5$, where M is a monovalent cation, is prepared by dissolving AgI and MI in a polar solvent and precipitating MAg4I5 particles by adding the resulting solution to a nonpolar solvent. In preferred embodiment of the invention, M is $Na^+$, $K^+$, $Rb^+$, $Cs^+$or $NH_4^+$ $K^+$, $Rb^+$ are particularly preferred. The mole ratio of AgI to MI is preferably 0.5:1 to 4:1, more preferably the ratio is 2:1 to 2.5:1. Illustrative polar solvents that can be used include, for example, acetone, methyl ethyl ketone, diethyl ketone, methylisobutyl ketone, cyclohexanone, acetonitrile, ethyl acetate and the like. Illustrative nonpolar solvents include, for example, toluene, xylene, bromopropane, ethylbenzene, trimethylbenzene, decahydronaphthalene, vinylidene chloride, dimethyl carbonate and the like. Toluene is particularly preferred. Typical polar solvent volume to AgI and MI powder weight ratios are in the range of about 4 to about 20 milliliters (ml):1 gram (g), preferably about 8 to about 10ml:1 g. Typical polar solvent volume to nonpolar solvent volume ratios are in the range of 10:1 to 1:10 or more with the preferred ratio being 1:1.5 to 1:4. If too little nonpolar solvent is used not all of the $MAg_4I_5$ dissolved in the polar solvent will precipitate to form particles and if too much nonpolar solvent is used the excess nonpolar solvent provides no benefit and is wasted.

Another embodiment of the invention comprises an emulsion of crystalline anisotropic particles of MAg4I5 in an organic solvent. When used to prepare a photothermographic element of the invention, the emulsion also comprises a binder. Illustrative binders include, gelatin, gelatin derivatives, cellulose derivatives, polysaccharides, such as dextran, gum arabic and the like; and synthetic polymeric substances, such as polyvinyl compounds like poly (vinylpyrrolidone) and acrylamide polymers. Other synthetic polymeric compounds that are useful include dispersed vinyl compounds such as in latex form and particularly those that increase the dimensional stability of photographic materials. Effective polymers include polymers of alkylacrylates and methacrylates, acrylic acid, sulfoacrylates and those that have crosslinking sites that facilitate hardening or curing. Preferred high molecular weight polymers and resins include poly(vinylbutyral), cellulose acetate butyrals, poly(methylmethacrylate), poly(vinyl pyrrolidone), ethyl cellulose, polystyrene, poly(vinyl chloride), chlorinated rubbers, polyisobutylene, butadiene-styrene copolymers, vinyl chloride-vinyl acetate copolymers, poly(vinyl alcohols) and polycarbonates. A particularly preferred binder is poly(vinyl butyral).

The organic solvent used in the emulsion is preferably a combination of the polar and nonpolar solvents used in preparing $MAg_4I_5$ anisotropic crystalline particles in accordance with this invention. The nonpolar solvent preferably contains the binder prior to addition of the AgI/MI solution in polar-solvent.

The photothermographic element preferably also contains a light-sensitive silver halide and other addenda in an emulsion layer and other components commonly used in photographic element, as discussed in more detail below. $MAg_4I_5$ in the form of anisotropic crystalline particles in the silver halide emulsion layer of a photothermographic element acts as a development contrast inhibitor In certain embodiments of the invention, it is desirable to use $MAg_4I_5$ particles in an aqueous medium. However, as mentioned above, $MAg_4I_5$ is unstable in water. In accordance with this invention, a stable aqueous emulsion of $MAg_4I_5$ is prepared by forming a saturated solution of water and a solute and then adding $MAg_4I_5$ to the saturated solution. The solute is preferably an inorganic salt or a water soluble organic compound, such as a sugar or a water soluble polymer. Preferred sugars include, for example, glucose, fructose, sucrose, sorbitol, mannitol, dextrose and the like. Preferred water soluble polymers include, for example, polyvinyl alcohol, polyethylene glycol, polyethylene oxide, $M^1$-polyethylene oxide (where $M^1$ is Li, Na, K, etc.), $M^2$-styrene sulfonic acid (where $M^2$ is Na, K, etc.), polyvinyl pyrrolidone, polyacrylic acid, dextran, methyl cellulose and the like.

Photothermographic elements, including films and papers, for producing images are well known. Photothermographic elements are typically processed by a method which comprises imagewise exposure of the element to actinic radiation to form a latent image therein followed by heating of the imagewise-exposed element to convert the latent image to a visible image. The simplicity of this method is highly advantageous. Photothermographic elements have been described heretofore in for example, Research Disclosure, June, 1978, Item No. 17029, U.S. Pat. Nos. 3,457,075; and 3,933,508.

The layers of the photothermographic element are coated on the support by coating procedures known in the photographic art, including dip coating, air knife coating, curtain coating or extrusion coating using coating hoppers. If desired, two or more layers are coated simultaneously.

Commonly utilized photothermographic elements comprise a support bearing, in reactive association, in a binder, such as poly(vinyl butyral), (a) photosensitive silver halide, prepared ex situ and/or in situ, and (b) an oxidation-reduction image-forming combination comprising (i) an organic silver salt oxidizing agent, preferably a silver salt of a long chain fatty acid, such as silver behenate, with (ii) a reducing agent for the organic silver salt oxidizing agent, preferably a phenolic reducing agent. The photothermographic silver halide element can comprise other addenda known in the art to help in providing a useful image, such as optional toning agents and image stabilizers. A preferred photothermographic element comprises a support bearing, in reactive association, in a binder, particularly a poly(vinyl butyral) binder, (a) photographic silver halide, prepared in situ and/or ex situ, (b) an oxidation-reduction image forming combination comprising (i) silver behenate, with (ii) a phenolic reducing agent for the silver behenate, (c) a toning agent, such as succinimide, and (d) an image stabilizer, such as 2-bromo-2-(4-methylphenylsulfonyl)acetamide.

The photothermographic element typically has an overcoat layer that helps protect the element from undesired marks. Such an overcoat can be, for example, a polymer as described in the photothermographic art. Such an overcoat can also be an overcoat comprising poly(silicic acid) and poly(vinyl alcohol) as described in U.S. Pat. No. 4,741,992.

The optimum layer thickness of the layers of the photothermographic element depends upon such factors as the processing conditions, thermal processing means, particular components of the element and the desired image. The layers typically have a layer thickness within the range of about 1 to about 10 microns.

The photothermographic element comprises a photosensitive component that consists essentially of photographic silver halide. In the photothermographic element it is believed that the latent image silver from the photographic silver halide acts as a catalyst for the described oxidation-reduction image-forming combination upon processing. A preferred concentration of photographic silver halide is within the range of about 0.01 to about 10 moles of silver halide per mole of silver behenate in the photothermographic element. Other photosensitive silver salts are useful in combination with the photographic silver halide if desired. Preferred photographic silver halides are silver chloride, silver bromide, silver bromoiodide, silver chlorobromoiodide and mixtures of these silver halides. Very fine grain photographic silver halide is especially useful. The photographic silver halide can be prepared by any of the procedures known in the photographic art. Such procedures for forming photographic silver halide are described in, for example, Research Disclosure, December 1978, Item No. 17643 and Research Disclosure, June 1978, Item No. 17029. Tabular grain photosensitive silver halide is also useful, such as described in, for example, U.S. Pat. No. 4,453,499. The photographic silver halide can be unwashed or washed, chemically sensitized, protected against production of fog and stabilized against loss of sensitivity during keeping as described in the above Research Disclosure publications. The silver halide can be prepared in situ as described in, for example, U.S. Pat. No. 3,457,075. Optionally the silver halide can be prepared ex situ as known in the photographic art.

The photothermographic element typically comprises an oxidation-reduction image-forming combination that contains an organic silver salt oxidizing agent, preferably a silver salt of a long-chain fatty acid. Such organic silver salt oxidizing agents are resistant to darkening upon illumination. Preferred organic silver salt oxidizing agents are silver salts of long-chain fatty acids containing 10 to 30 carbon atoms. Examples of useful organic silver oxidizing agents are silver behenate, silver stearate, silver oleate, silver laurate, silver caprate, silver myristate, and silver palmitate. Combinations of organic silver salt oxidizing agents are also useful. Examples of useful silver salt oxidizing agents that are not silver salts of fatty acids include, for example, silver benzoate and silver benzotriazole.

The optimum concentration of organic silver salt oxidizing agent in the photothermographic material will vary depending upon the desired image, particular organic silver salt oxidizing agent, particular reducing agent, particular fatty acids in the photothermographic composition, and the particular photothermographic element. A preferred concentration of organic silver salt oxidizing agent is typically within the range of 0.5 mole to 0.90 mole per mole of total silver in the photothermographic element. When combinations of organic silver salt oxidizing agents are present, the total concentration of organic silver salt oxidizing agents is within the described concentration range.

A variety of reducing agents are useful in the oxidation-reduction image-forming combination. Examples of useful reducing agents include substituted phenols and naphthols such as bis-beta-naphthols; polyhydroxybenzenes, such as hydroquinones; catechols and pyrogallols, aminophenol reducing agents, such as 2,4-diaminophenols and methylaminophenols, ascorbic acid, ascorbic acid ketals and other ascorbic acid derivatives; hydroxylamine reducing agents; 3-pyrazolidone reducing agents; sulfonamidophenyl reducing agents such as described in U.S. Pat. No. 3,933,508 and Research Disclosure, June 1978, Item No. 17029. Combinations of organic reducing agents are also useful.

Preferred organic reducing agents in the photothermographic materials are sulfonamidophenol reducing agents, such as described in U.S. Pat. No. 3,801,321. Examples of useful sulfonamidophenol reducing agents include 2,6-dichloro-4-benzenesulfonamidophenol; benzenesulfonamidophenol; 2,6-dibromo-4-benzenesulfonamidophenol and mixtures thereof.

An optimum concentration of reducing agent in a photothermographic material varies depending upon such factors as the particular photothermographic element, desired image, processing conditions, the particular organic silver salt oxidizing agent and manufacturing conditions for the photothermographic material. A particularly useful concentration of organic reducing agent is within the range of 0.2 mole to 2.0 mole of reducing agent per mole of silver in the photothermographic material. When combinations of organic reducing agents are present, the total concentration of reducing agents is preferably within the described concentration range.

The photothermographic material preferably comprises a toning agent, also known as an activator-toning agent or a toner-accelerator. Combinations of toning agents are useful in photothermographic materials. An optimum toning agent or toning agent combination depends upon such factors as the particular photothermographic material, desired image and processing conditions. Examples of useful toning agents and toning agent combinations include those described in, for example, Research Disclosure, June 1978, Item No. 17029 and U.S. Pat. No. 4,123,282. Examples of useful toning agents include phthalimide, N-hydroxyphthalimide, N-potassium phthalimide, succinimide, N-hydroxy-1,8-naphthalimide, phthalazine, 1-(2H)-phthalazinone and 2-acetyphthalazinone.

Stabilizers are also useful in the photothermographic material. Examples of such stabilizers and stabilizer precursors are described in, for example, U.S. Pat. Nos. 4,459,350 and 3,877,940. Such stabilizers include photolytically active stabilizers and stabilizer precursors, azole thioethers and blocked azolinethione stabilizer precursors and carbamoyl stabilizer precursors.

Photothermographic materials preferably contain various colloids and polymers, alone or in combination, as vehicles or binding agents utilized in various layers. Useful materials are hydrophobic or hydrophilic. They are transparent or translucent and include both naturally occurring substances such as proteins, for example, gelatin, gelatin derivatives, cellulose derivatives, olysaccharides, such as dextran, gum arabic and the like; and synthetic polymeric substances, such as polyvinyl compounds like poly(vinylpyrrolidone) and acrylamide polymers. Other synthetic polymeric compounds that are useful include dispersed vinyl compounds such as in latex form and particularly those that increase the dimensional stability of photographic materials. Effective polymers include polymers of alkylacrylates and methacrylates, acrylic acid, sulfoacrylates and those that have crosslinking sites that facilitate hardening or curing. Preferred high molecular weight polymers and resins include poly (vinylbutyral), cellulose acetate butyrals, poly (methylmethacrylate), poly(vinyl pyrrolidone), ethyl cellulose, polystyrene, poly(vinyl chloride), chlorinated rubbers, polyisobutylene, butadiene-styrene copolymers, vinyl chloride-vinyl acetate copolymers, poly(vinyl alcohols) and polycarbonates.

The photothermographic materials can contain development modifiers that function as speed increasing compounds, sensitizing dyes, hardeners, antistatic layers, plasticizers and lubricants, coating aids, brighteners, absorbing and filter dyes, and other addenda, such as described in Research Disclosure, June 1978, Item No. 17029 and Research Disclosure, December 1978, Item No. 17643.

A photothermographic element, as described, also preferably comprises a thermal stabilizer to help stabilize the photothermographic element prior to imagewise exposure and thermal processing. Such a thermal stabilizer aids improvement of stability of the photothermographic element during storage. Typical thermal stabilizers are: (a) 2-bromo-2-arylsulfonylacetamides, such as 2-bromo-2-p-tolylsulfonylacetamide; (b) 2-(tribromomethyl sulfonyl) benzothiazole and (c) 6-substituted-2,4-bis (tribromomethyl)-S-triazine, such as 6-methyl or 6-phenyl-2,4-bis(tribromomethyl)-s-triazine. Heating means known in the photothermographic art are useful for providing the desired processing temperature. The heating means is, for example, a simple hot plate, iron, roller, heated drum, microwave heating means, heated air or the like.

Thermal processing is preferably carried out under ambient conditions of pressure and humidity. Conditions outside normal atmospheric conditions can be used if desired.

The components of the photothermographic element can be in any location in the element that provides the desired image. If desired, one or more of the components of the element can be distributed between two or more of the layers of the element. For example, in some cases, it s desirable to include certain percentages of the organic reducing agent, toner, stabilizer precursor and/or other addenda in an overcoat layer of the photothermographic element.

It is necessary that the components of the imaging combination be "in association" with each other in order to produce the desired image. The term "in association" herein means that in a photothermographic element the photosensitive silver halide and the image-forming combination are in a location with respect to each other that enables the desired processing and produces a useful image.

The photothermographic elements of this invention are typically provided with an overcoat layer and/or a backing layer, with the overcoat layer being the outermost layer on the side of the support on which the imaging layer is coated and the backing layer being the outermost layer on the opposite side of the support. Other layers which are advantageously incorporated in photothermographic imaging elements include subbing layers and barrier layers.

To be fully acceptable, a protective overcoat layer for such imaging elements should: (a) provide resistance to deformation of the layers of the element during thermal processing, (b) prevent or reduce loss of volatile components in the element during thermal processing, (c) reduce or prevent transfer of essential imaging components from one or more of the layers of the element into the overcoat layer during manufacture of the element or during storage of the element prior to imaging and thermal processing, (d) enable satisfactory adhesion of the overcoat to a contiguous layer of the element, and (e) be free from cracking and undesired marking, such as abrasion marking, during manufacture, storage, and processing of the element.

A backing layer also serves several important functions which improve the overall performance of photothermographic imaging elements. For example, a backing layer serves to improve conveyance, reduce static electricity and eliminate formation of Newton Rings. A particularly preferred overcoat for photothermographic imaging elements is an overcoat comprising poly(silicic acid) as described in U.S. Pat. No. 4,741,992, issued May 3, 1988. Advantageously, water-soluble hydroxyl-containing monomers or polymers are incorporated in the overcoat layer together with the poly(silicic acid). The combination of poly(silicic acid) and a water-soluble hydroxyl-containing monomer or polymer that is compatible with the poly(silicic acid) is also useful in a backing layer on the side of the support opposite to the imaging layer as described in U.S. Pat. No. 4,828,971, issued May 9, 1989.

U.S. Pat. No. 4,828,971 explains the requirements for backing layers in photothermographic imaging elements. It points out that an optimum backing layer must:

(a) provide adequate conveyance characteristics during manufacturing steps, (b) provide resistance to deformation of the element during thermal processing, (c) enable satisfactory adhesion of the backing layer to the support of the element without undesired removal during thermal processing, (d) be free from cracking and undesired marking, such as abrasion marking during manufacture, storage and processing of the element, (e) reduce static electricity effects during manufacture and (f) not provide undesired sensitometric effects in the element during manufacture, storage or processing.

A wide variety of materials can be used to prepare a backing layer that is compatible with the requirements of photothermographic imaging elements.

The backing layer should be transparent and colorless and should not adversely affect sensitometric characteristics of the photothermographic element such as minimum density, maximum density and photographic speed. Preferred backing layers are those comprised of poly(silicic acid) and a water-soluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, cellulose acetate, crosslinked polyvinyl alcohol, terpolyihers of acrylonitrile, vinylidene chloride, and 2-(methacryloyloxy) ethyltrimethylammonium methosulfate, crosslinked gelatin, polyesters and polyurethanes.

In the photothermographic imaging elements of this invention, either organic or inorganic matting agents can be used. Examples of organic matting agents are particles, often in the form of beads, of polymers such as polymeric esters of acrylic and methacrylic acid, e.g., poly (methylmethacrylate), styrene polymers and copolymers, and the like. Examples of inorganic matting agents are particles of glass, silicon dioxide, titanium dioxide, magnesium oxide, aluminum oxide, barium sulfate, calcium carbonate, and the like. Matting agents and the way they are used are further described in U.S. Pat. Nos. 3,411,907 and 3,754,924.

The backing layer preferably has a glass transition temperature (Tg) of greater than 50° C., more preferably greater than 100° C., and a surface roughness such that the Roughness Average (Ra) value is greater than 0.8, more preferably greater than 1.2, and most preferably greater than 1.5.

As described in U.S. Pat. No. 4,828,971, the Roughness Average (Ra) is the arithmetic average of all departures of the roughness profile from the mean line. The concentration of matting agent required to give the desired roughness depends on the mean diameter of the particles and the amount of binder. Preferred particles are those with a mean diameter of from about 1 to about 15 micrometers, preferably from 2 to 8 micrometers. The matte particles can be usefully employed at a concentration of about 1 to about 100 milligrams per square meter.

The following examples illustrate the invention.

EXAMPLE 1

Preparation procedure for a AgI and RbI in acetone solution.

Solutions of acetone dissolved AgI and RbI were prepared by weighing AgI and RbI powders in mole ratios, ranging from 0.5:1 to 4:1 AgI:RbI with the preferred ratio being 2:1 to 2.5:1 AgI:RbI, followed by addition of acetone.

At room temperature (22° C.) 1.70 g AgI and 0.77 g RbI were dispersed in 20 ml of acetone, then stirred for 10 minutes using a magnetic stir bar. The AgI and RbI powders dissolved and the resulting solution was gravity filtered using a 984H ultra filter, before storage in a glass container.

EXAMPLE 2

Preparation procedure for a AgI and KI solution.

At room temperature (22° C.) 1.71 g AgI and 0.48 g KI were dispersed in 20 ml of acetone, then stirred for 10 minutes using a magnetic stir bar. The AgI and KI powders dissolved and the resulting solution was gravity filtered using a 984H ultra filter, before storage in a glass container.

EXAMPLE 3

Addition process of AgI and RbI in acetone solution to toluene and the XRD results.

At room temperature (22° C.) 1.36 g AgI and 0.49 g RbI were dispersed in 20 ml of acetone, then stirred for 10 minutes using a magnetic stir bar. The AgI and RbI powders dissolved and the resulting solution was gravity filtered using a 984H ultra filter. The filtered solution was poured into 30 ml of toluene, resulting in formation of a white precipitate. This precipitate was observed to have a fine powder morphology under an optical microscope. X-ray diffraction analysis (XRD) found the major phase to be $RbAg_4I_5$ and the minor phase to be $Rb_2AgI_3$. A characteristic X-ray diffraction pattern is shown in FIG. 1.

EXAMPLE 4

Addition process (of Example 2) to toluene and the XRD results.

Figure 2:
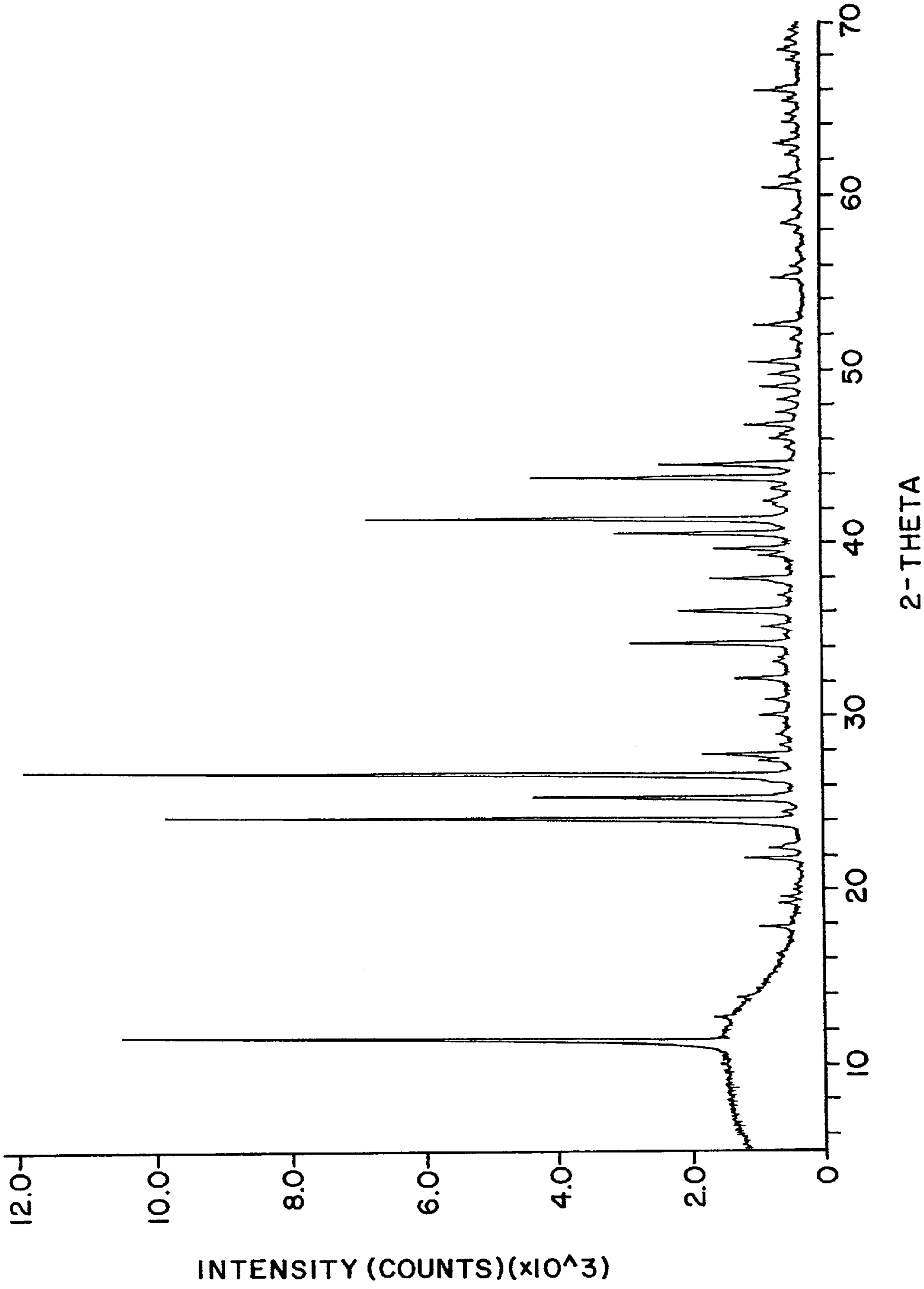

20 ml of the solution from Example 2 were poured into 30 ml of toluene, resulting in formation of a white precipitate. This precipitate was observed to have a fine powder morphology under an optical microscope. X-ray diffraction analysis (XRD) found the major phase to be $KAg_4I_5$ the moderate phase to be KI, and a trace amount to be $K_2AgI_3$. A characteristic X-ray diffraction pattern is shown in FIG. 2.

EXAMPLE 5

The precipitation process for generating a $RbAg_4I_5$ emulsion by dissolving AgI and RbI in acetone, followed by addition of this solution to Butvar in toluene and the XRD results.

Figure 3:
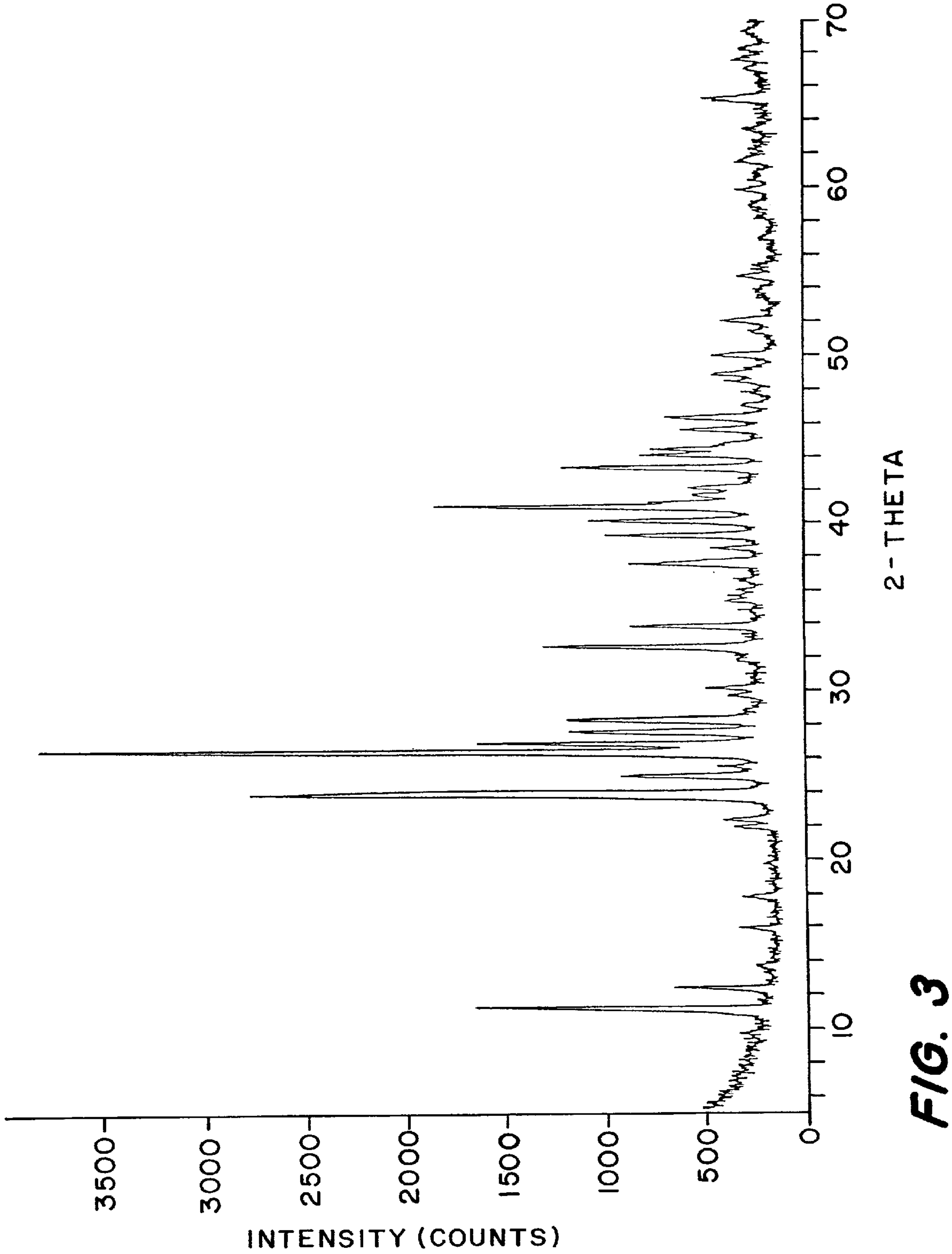

At room temperature (22° C.) 42.5 g AgI and 19.0 g RbI were dispersed in 500 ml of acetone, then stirred for 15 hours using a magnetic stir bar. The AgI and RbI powders dissolved and the resulting solution was gravity filtered using a 984H ultra filter. 100 ml of this solution were added at a rate of 10 ml/min. to 400 ml of a toluene/5 wt. % Butvar B-76 (a polyvinyl butyral commercially available Monsanto) solution using a single jet precipitation apparatus, resulting in formation of a white precipitate. This precipitate was observed to have a rod-like morphology under a scanning electron microscope. The length of these rods had a range of 4–20 microns with a mean length of 10 microns, and the width of these rods had a range of 0.4 to 2 microns with a mean width of 1 micron. X-ray diffraction analysis (XRD) found the major phase to be $RbAg_4I_5$ and the minor phase to be $Rb_2AgI_3$. A characteristic X-ray diffraction pattern is shown in FIG. 3.

EXAMPLE 6

The addition process (of Example 5) to saturated NaCl in water and the XRD results.

Figure 4:
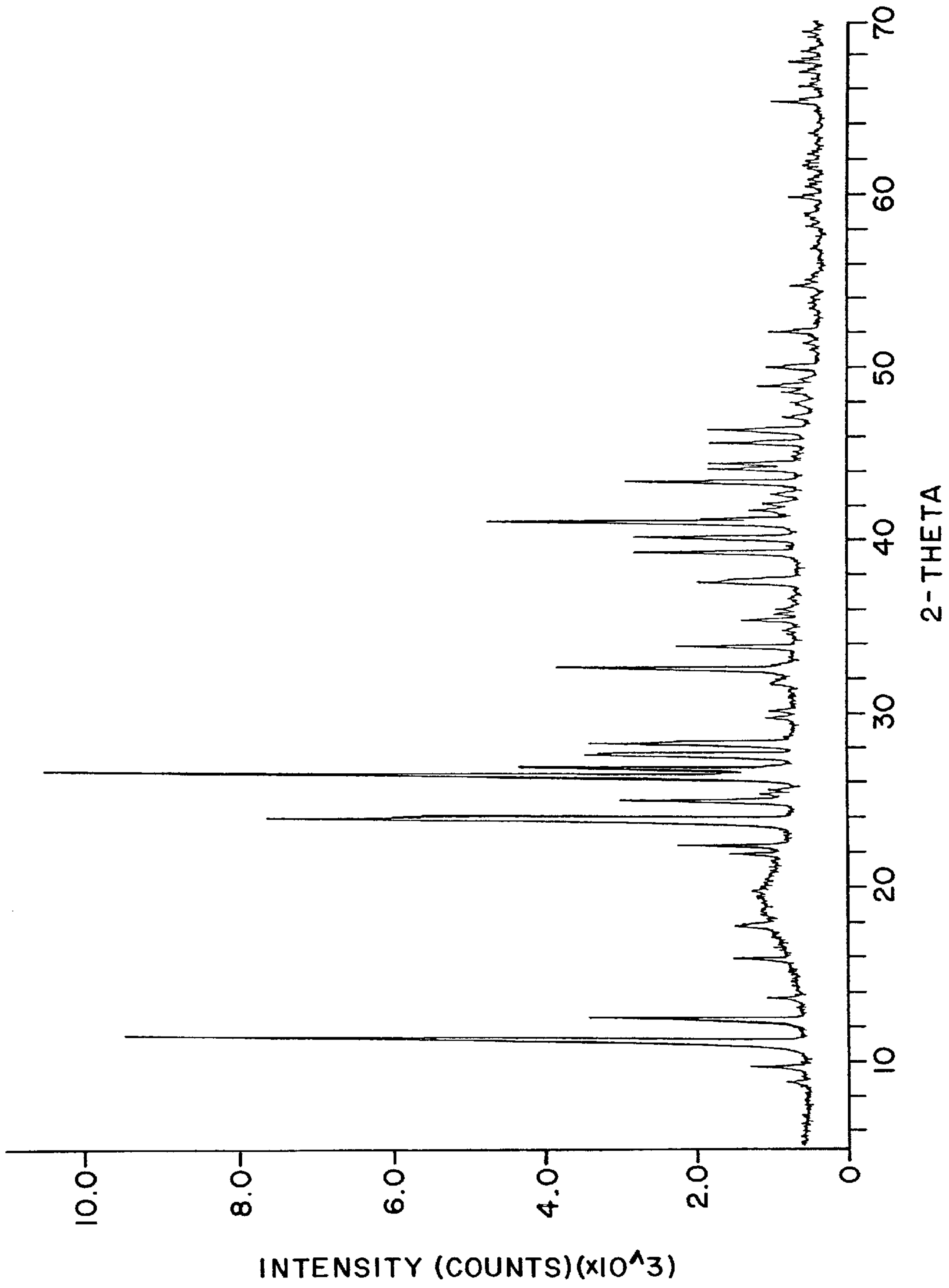

At room temperature (22° C.) 2 ml of a saturated NaCl/water solution (20.33 g NaCl mixed in 50.51 g water) were added to 15 ml of the solution prepared in Example 5, stirred for 2 minutes using a magnetic stir bar, then allowed to sit undisturbed for 10 minutes. 0.5 ml of this mixture was removed and placed on a quartz plate then allowed to dry in ambient air. X-ray diffraction analysis (XRD) found the major phase to be $RbAg_4I_5$ and the minor phase to be $Rb_2AgI_3$. A characteristic X-ray diffraction pattern is shown in FIG. 4.

Figure 5:
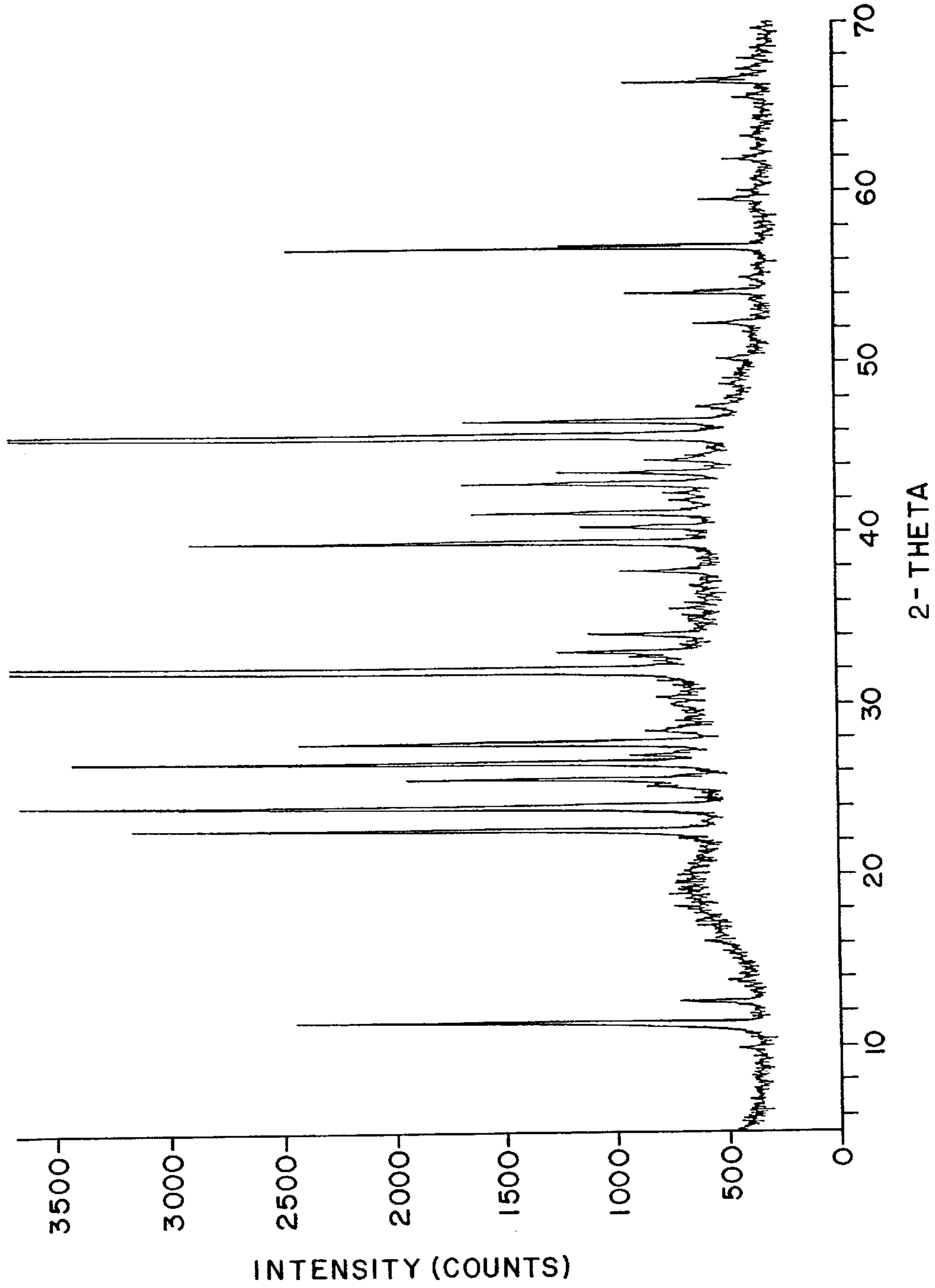

At room temperature (22° C.) 6 ml of a saturated NaCl/water solution (20.33 g NaCl mixed in 50.51 g water) were added to 15 ml of the solution prepared in Example 5, stirred for 30 minutes using a magnetic stir bar, then allowed to sit undisturbed for 14 hours. 0.5 ml of this mixture was removed and placed on a quartz plate then allowed to dry in ambient air. X-ray diffraction analysis (XRD) found the major phases to be $RbAg_4I_5$ and AgI, and the minor phase to be $Rb_2AgI_3$, along with NaCl from the dried saturated NaCl/water solution. A characteristic X-ray diffraction pattern is shown in FIG. 5.

EXAMPLE 7

This example illustrates the preparation of a photothermographic composition in accordance with this invention. Several coating compositions were prepared to demonstrate the photothermographic properties of the inventive material. The following coatings contained the following components:

EM-1 Cubic silver bromide emulsion 0.065 μm in equivalent spherical diameter precipitated in acetone by methods known in the art.

SB-1 Silver behenate emulsion dispersed in Butvar B-76 and organic solvent.

DEV-1 Developing agent N-(4-hydroxyphenyl) benzenesulfonamide.

ACC-1 Succinimide toning agent.

MA-1 $RbAg_4I_5$ emulsion prepared in accordance with Example 5.

Coated elements were prepared by coating a single photothermographic layer on a transparent support. Each of the coatings contained 50.8 mg/dm$^2$ of poly(vinylbutyral) binder. Table I contains the laydown for the remaining materials, given in mg/dm$^2$.

TABLE I

Coating compositions

| Coating | EM-1 | SB-1 | DEV-1 | ACC-1 | MA-1 |
|---|---|---|---|---|---|
| C-1 | 2.2 | 10.8 | 10.8 | 2.2 | 0.0 |
| C-2 | 2.2 | 10.8 | 10.8 | 2.2 | 3.2 |
| C-3 | 0.0 | 10.8 | 10.8 | 2.2 | 3.2 |
| C-4 | 2.2 | 0.0 | 10.8 | 2.2 | 3.2 |
| C-5 | 0.0 | 10.8 | 10.8 | 2.2 | 0.0 |

Each coating was exposed by a 3000 K light source through a step wedge for 40 seconds, followed by thermal processing for 10 seconds at 120° C. The performance is summarized in Table II. Density was measured as Status M green density. Dmin represents the minimum density at low exposure and Dmax represents the maximum density at the highest exposure.

TABLE II

Coating results

| Coating | Rawstock Density | Dmin | Dmax |
|---|---|---|---|
| C-1 | — | 0.14 | 0.93 |
| C-2 | — | 0.16 | 0.26 |
| C-3 | 0.04 | 0.10 | 0.14 |
| C-4 | — | 0.07 | 0.08 |
| C-5 | 0.03 | 0.06 | 0.31 |

A comparison of coatings C-1 with C-2 as well as C-3 with C-5 shows the inventive material acted as a development contrast inhibitor, reducing the Dmax. The control coating C-4 shows that the inventive material did not substitute for silver behenate as the physical development silver source under the present thermal development condition. The rawstock density of coatings C-3 and C-5 show that the inventive material did not have a significant impact on optical density in the absence of development.

The $MAg_4I_5$ solid electrolyte of this invention can be used in the manufacture of, for example, batteries, sensors, electrical capacitors and solid state devices.

The invention has been described in detail with particular reference to certain preferred embodiments thereof, but it will be understood that variations and modifications can be effected within the spirit and scope of the invention.

What is claimed is:

1. A compositon comprising $MAg_4I_5$, wherein M is a monovalent cation, in the form of anisotropic crystalline particles.

2. The composition according to claim 1, wherein said particles have an equivalent circular diameter of 4 to 2 microns and a length of 4 to 20 microns.

* * * * *